United States Patent
Mamonov

[11] Patent Number: 5,823,283
[45] Date of Patent: Oct. 20, 1998

[54] CONTAINER CONVERTIBLE INTO AIR CUSHION SUPPORT

[75] Inventor: Alexandr Sergeevich Mamonov, Kirov, ulitsa Upita, Russian Federation

[73] Assignee: Aktsionernoe Obscnestvo otkrytogo Tipa Proizvodstenno-Torgovaya Avtor, Kirov, Russian Federation

[21] Appl. No.: 524,380

[22] Filed: Sep. 6, 1995

[30] Foreign Application Priority Data

Sep. 13, 1994 [RU] Russian Federation ............. 94033135

[51] Int. Cl.$^6$ ................................ B60V 3/00; B63B 7/00
[52] U.S. Cl. ............................................. 180/116; 440/11
[58] Field of Search .................................... 180/116, 120, 180/122, 125, 127, 129, 208; 280/656; 114/352, 353, 354, 67 A; 440/11

[56] References Cited

U.S. PATENT DOCUMENTS

| | | | |
|---|---|---|---|
| 3,211,124 | 10/1965 | Mantle | 115/5 |
| 3,265,025 | 8/1966 | Halgh | 114/60 |
| 3,270,827 | 9/1966 | Mantle . | |
| 3,401,767 | 9/1968 | Barr | 180/127 |
| 3,754,617 | 8/1973 | Duthion | 180/121 |
| 3,810,522 | 5/1974 | Morgan et al. | 180/116 |
| 3,840,089 | 10/1974 | Allison | 180/116 |
| 4,175,636 | 11/1979 | Broughton | 180/127 X |
| 4,237,992 | 12/1980 | Bristow | 180/116 |
| 5,495,911 | 3/1996 | Mamonov | 180/116 |

FOREIGN PATENT DOCUMENTS

| | | |
|---|---|---|
| 3033938 | 3/1982 | Germany . |
| 1537124 | 12/1978 | United Kingdom . |
| 9321049 | 10/1993 | WIPO . |

OTHER PUBLICATIONS

Neoteric Hovercraft Inc. Low Speed Air Cushion Platforms, 1 Sheet, p. 170 (Nov. 1988).

*Primary Examiner*—Victor E. Johnson
*Attorney, Agent, or Firm*—Ladas & Parry

[57] ABSTRACT

An apparatus (1) that can be converted into an air cushion support or into an air cushion support for a vehicle (3). This apparatus can be folded into a compact container or put onto its own wheels (2) permitting it to be hauled as a trailer. The apparatus comprises a latticed folding base composed of hingedly connected main sections (10) and perimeter sections (11–14), a flexible inflatable air cushion skirt (5) and coupling means (8,9) for coupling the vehicle (3) to the main sections of the base, to propulsion and blowing means (6) and to a steering gear mechanism (7). The lower surface of latticed sections is covered by elastic airtight sheet material (33,34) which forms a chamber (35) of the flexible inflatable skirt and an air cushion chamber (37). Longitudinal (19) and transverse (20) girders of main sections of the base are connected by elastic and resilient coupling elements (21) permitting limited displacements of these girders against each other and thus giving to the base the capability of matching, to a certain extent, a given terrain contour when the apparatus is converted into an air cushion support and used as a vehicle for travel.

16 Claims, 5 Drawing Sheets

CONTAINER CONVERTIBLE INTO AIR CUSHION SUPPORT

FIELD OF INVENTION

This invention relates to an apparatus forming a container convertible into an air cushion support.

PRIOR ART

Known is a GEM kit for an automobile that can be converted into an air cushion support for the automobile comprising a rigid platform with a detachable flexible air cushion skirt, there being mounted on this platform removable propulsion and blowing means, steering gear and means for coupling them to the automobile units (U.S. Pat. No. 3,270,827).

But complete dismemberment of the rigid sectionalized platform and storage of all the parts of the automobile air cushion support in the automobile itself increase platform assembly time and reduce effective load-carrying capacity of the automobile. Besides, when vehicles with different wheelbase dimensions are used it is necessary to have several modifications of center sections of the rigid sectionalized platform which creates additional inconveniences in operation.

Also known is a trailer-container for a vehicle that can be converted into its air cushion support, comprising a rigid folding base composed of hingedly connected main and perimeter sections and provided with a flexible inflatable air cushion guard; further comprising detachably mountable rotor-type propulsion and blowing means, steering gear and means for coupling them to corresponding drives of a vehicle, as well as means for coupling the vehicle to the trailer-container base (PCT RU 92100078, dated Apr. 15, 1992).

The known trailer-container when unfolded constitutes a rigid platform. Its main sections together with perimeter sections are rigidly fixed so as to avoid folding of the base around its hinge joints.

It should be noted that such rigidity of the base necessitates reinforcing it in order to avoid plastic deformations which may occur in the process of operation and this leads to weight increase and reduces payload of the air cushion support.

Besides, functional capabilities of the aforementioned analogs are limited because in non-operational condition they can be transported only as a supplementary kit in a body of a vehicle or hauled as a trailer.

Their functions are also limited in operational mode since they can be used only together with a vehicle, this vehicle also being a drive for their propulsion and blowing means.

SUMMARY OF THE INVENTION

Primary objects of the invention are: first, to create an apparatus of a design that would permit to an extension of its functional capabilities both in operational and non-operational conditions; second, to make this apparatus a more simple construction and to increase its technical capabilities by creating a certain flexibility of the air cushion platform, thus enabling it to partially match a given terrain contour.

This task is accomplished as described below. The apparatus convertible into an air cushion support and foldable into a compact container comprises a folding base composed of hingedly linked main and perimeter sections, detachably mountable propulsion and blowing means with means for driving them, a detachable steering gear and a flexible inflatable air cushion skirt. According to the invention the aforementioned folding base is made as a flexible latticed structure. Main sections of the base are provided with transverse girders and with at least two longitudinal girders. Longitudinal girders are coupled to transverse girders by means of elastic and resilient coupling elements permitting limited displacements of the girders against each other and so the base with its sections unfolded and forming an air cushion support is given the capability of matching, to a certain extent, a given terrain contour.

Each elastic and resilient coupling element incorporates at least two coaxially placed bushings. These bushings interact through their outer surfaces with a fastening element of a girder going in one direction and through their inner surfaces and outer end faces with a fastening element of a girder going in another direction.

Each of these coaxially mounted bushings is made of vulcanized rubber or plastics.

Main sections of the base are fitted with double-pin three-link hinge joints permitting the apparatus to be folded into a compact container.

Besides, the apparatus is provided with rigid coupling elements for fixing main sections of the base in unfolded position, these rigid coupling elements being detachably mountable units.

Each of these rigid detachable coupling elements is made as a girder length interacting with responding elements located on longitudinal girders.

The lower surface of main and perimeter sections of the base is covered by elastic airtight sheet material, sheet overlapping one another.

This elastic airtight sheet material is arranged in such a way that it can form a chamber of the flexible inflatable skirt.

Besides, the flexible inflatable skirt together with the elastic airtight sheet material of main sections of the base are secured in an airtight fashion along outer perimeter of the lower surface of the base thus forming an inner cavity of an air cushion chamber.

Perimeter sections of the base and the flexible inflatable air cushion skirt are provided with fastening elements for connecting them in unfolded position and for further disconnecting them during successive fold-up of the apparatus into a compact container.

Besides, main sections of the base are provided with disengagable means for securing running of a vehicle when the vehicle is installed on the unfolded apparatus. In this case the vehicle suspension can damp disturbances occurring in the process of travel on a cushion of air.

Use of elastic and resilient coupling elements permits to make longitudinal and transverse girders such that they can be rearranged to match dimensions of a vehicle used.

Each propulsor-blower installation is provided with kinematic coupling for coupling it to a vehicle drive when the vehicle is installed on the air cushion support.

Besides, the apparatus is supplemented by means for hauling it as trailer by a vehicle after this apparatus has been folded into a compact container.

Advantages of the claimed invention will be more evident if illustrated by accompanying drawings and explained by detailed description given below.

DETAILED DESCRIPTION

Figure 1:
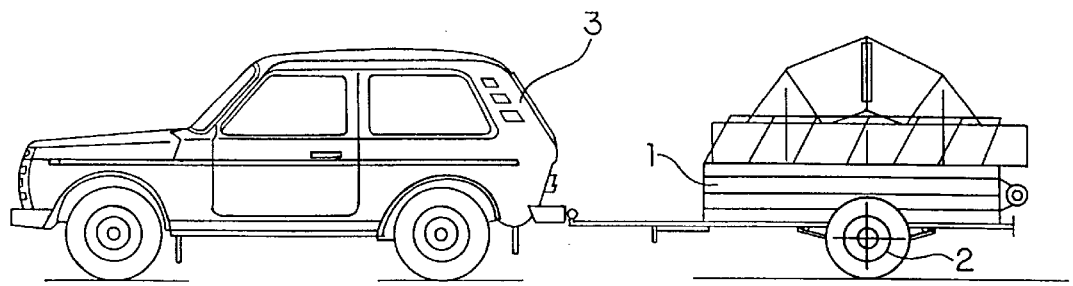
FIG. 1 is a side view of the apparatus when folded into a compact container, standing on its own wheels.

Referring now to the drawings and describing this invention in detail, the apparatus convertible into an air cushion support and foldable into a compact container is used in two modes: passive mode and active mode.

Figure 13:
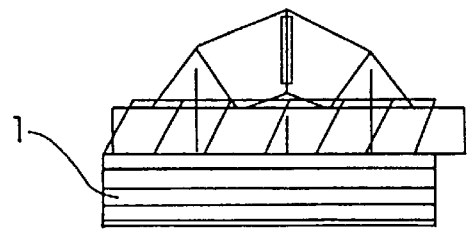
FIG. 13 is a side view of tile apparatus folded into a compact container.

In the passive mode the apparatus is folded into the compact container 1 (FIG. 13) and in this condition it can be carried by any transportation means.

Besides, to facilitate case of transportation the apparatus 1 can be put on its own wheels 2 and hauled as a trailer by the vehicle 3 (FIG. 1).

Figure 14:
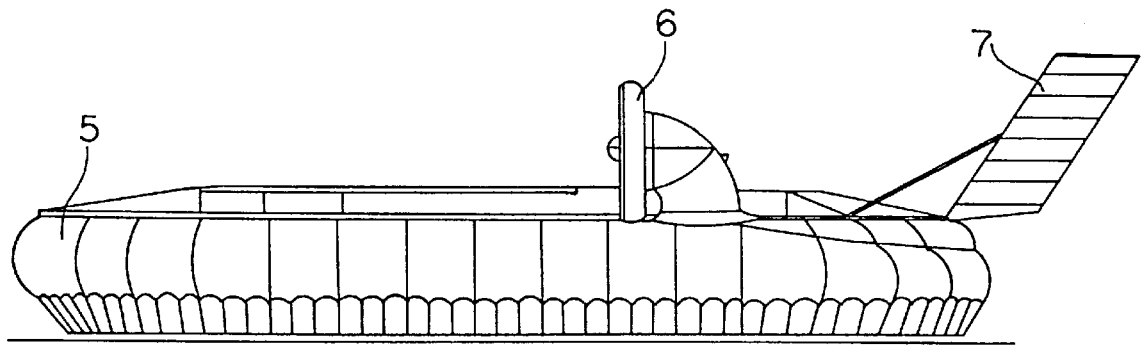
FIG. 14 is a side view of the apparatus converted into an air cushion support.
Figure 15:
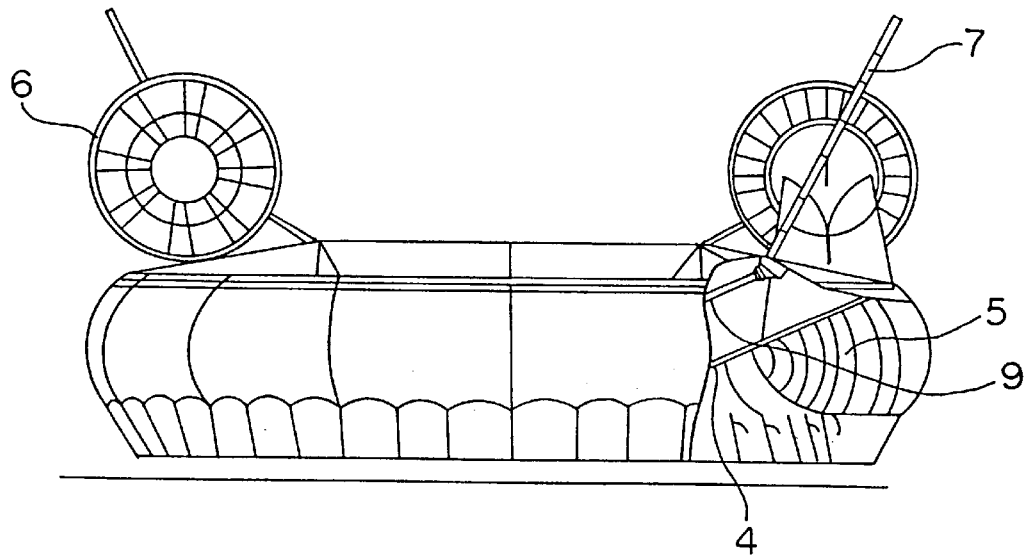
FIG. 15 is a front view of the apparatus converted into an air cushion support.

In the active mode the apparatus is converted into an air cushion support with its own drives (FIGS. 14, 15).

Figure 2:
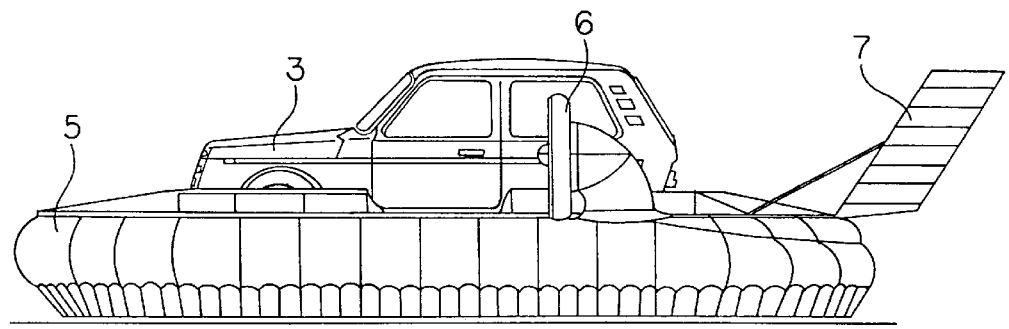
FIG. 2 is a side view of the apparatus converted into an air cushion support, carrying an automobile.
Figure 3:
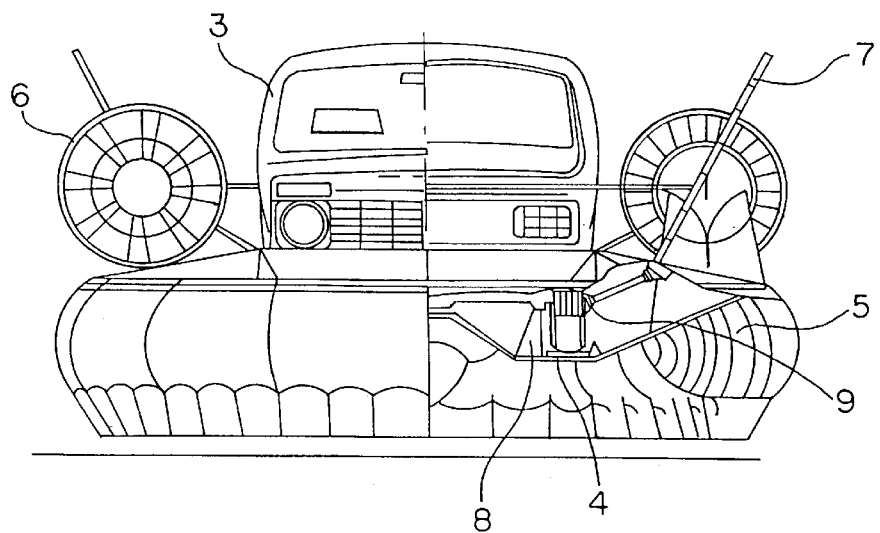
FIG. 3 is a front view of the apparatus converted into an air cushion support, carrying an automobile.

Besides, the apparatus when unfolded can accommodate the vehicle 3 (FIGS. 2, 3) and in this case a drive of the vehicle is used.

Generally, the apparatus comprises the folding base 4 (FIGS. 3, 4) on which there are the flexible inflatable skirt 5, detachably mountable rotor-type propulsion and blowing means 6 and the detachable steering gear 7 carried by and attached to this base.

When the apparatus is used together with a vehicle, the vehicle is secured to the disengagable brackets 8 (FIG. 3) mountable on the base 4. In this case the drive of the vehicle is coupled through the kinematic coupling means 9 to the propulsion and blowing means 6 to rotate an air cushion blower and an airscrew thus creating a controllable thrust. The kinematic coupling means used here permit the blower and the airscrew to function independently.

Figure 4:
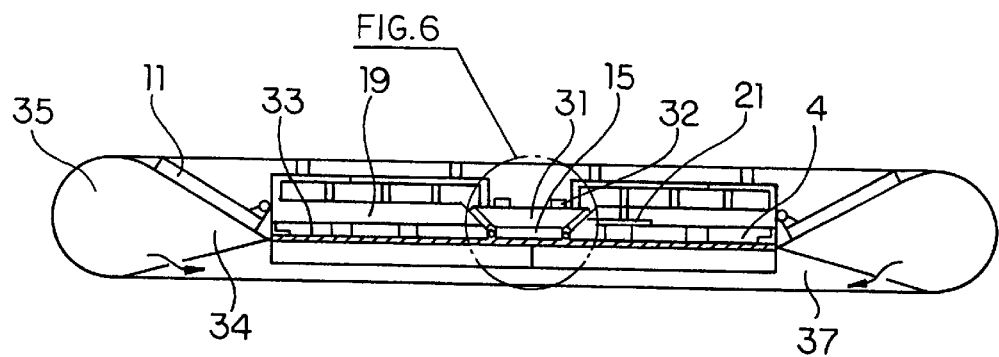
FIG. 4 is a cross-sectional view of a base with a flexible inflatable skirt, unfolded.
Figure 5:
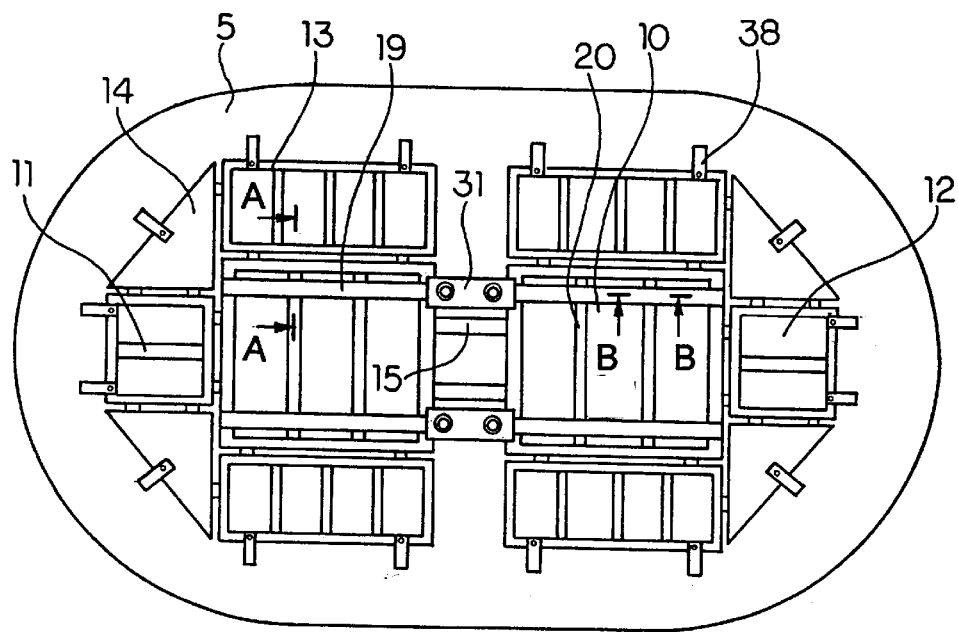
FIG. 5 is a plan view of FIG.4.

The latticed folding base 4 (FIGS. 4, 5) composed of the at least two main latticed sections 10 and latticed perimeter sections—the bow section 11, the rear section 12 and the side perimeter sections 13 forms the apparatus body structure. The triangular inserts 14 are mounted between the bow section and the side perimeter sections as well as between the rear section and the side perimeter sections. All the sections are fitted with hinge joints permitting the sections to be unfolded into a platform and folded back into a compact package. The main sections of the base are linked by the double-pin three-link hinge joints 15 (FIG. 4).

Figure 6:
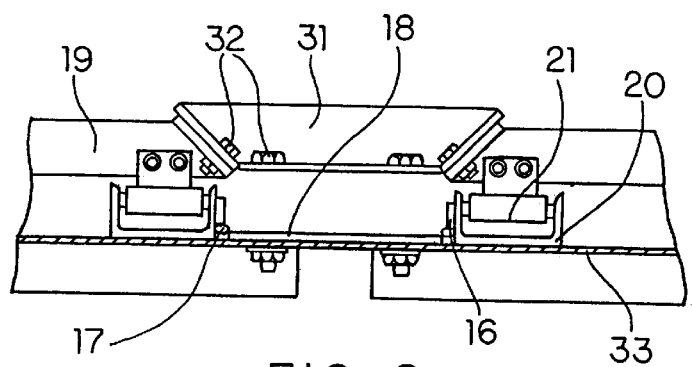
FIG. 6 is a view of fragment T of FIG.4.
Figure 7:
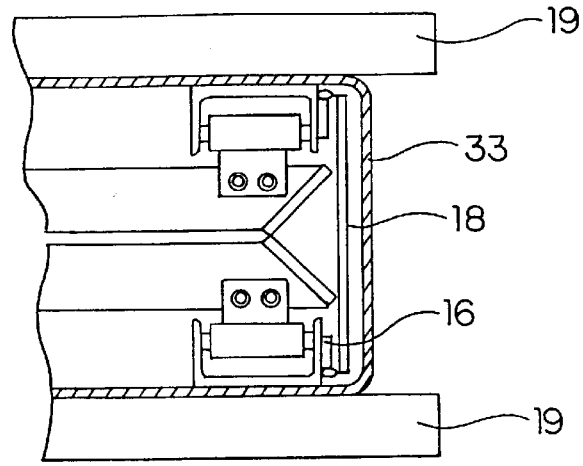
FIG. 7 is a view of fragment T of FIG. 4, sections folded.

The hinges 16 (FIGS. 6, 7) of a three-link hinge-joint are secured to transverse girders of each main section of the base and through the pins 17 linked together by the extended middle link 18.

Each of the main sections of the base is fitted with the at least two longitudinal load-carrying girders 19 (FIGS. 4, 5) which interact through the elastic and resilient coupling elements 21 with the transverse girders 20 located under the longitudinal girders. Additional installation of longitudinal girders under transverse girders is possible.

The presence of the elastic and resilient coupling elements permits to make longitudinal and transverse girders such that they call be rearranged to match dimensions of a vehicle used.

Each of the coupling elements 21 is made of elastic and resilient material, for example rubber or plastic. Each of the coupling elements 21 incorporates the at least two coaxially mounted bushings 22 with conical outer surfaces, top parts of the working cones 23 facing each other. The bushings 22 interact through their outer surfaces with the fastening elements 24 of the transverse girder 20. At the same time, the inner surfaces 25 and the outer end faces 26 of the bushings 22 interact with fastening elements of a longitudinal girder, these fastening elements being made as the bushings 27, 28 with the washers 29 pulled together by the bolts 30.

Due to the presence of elastic and resilient coupling elements longitudinal and transverse girders are capable of limited displacements against each other thus transmitting to a platform with or without a vehicle a certain flexibility and permitting this platform to partially match, when translating or landing on ground, a given terrain contour whereby considerably reducing inner stresses in section structures of the base.

Such a design permits to reduce total weight of the apparatus and to increase load-carrying capacity of an air cushion support.

At tile same time it makes travel in a vehicle on an air cushion support more comfortable because the vehicle suspension, which in this case is being used, damps disturbances resulting from terrain roughness.

In order to avoid spontaneous folding up of unfolded base sections the apparatus is provided with the rigid detachable coupling elements 31 (FIGS. 4–6) mounted between the upper longitudinal girders 19. Each of these rigid coupling elements is made as a girder length looking in cross-section like an isosceles trapezoid. Sides of this girder length have flanges which interact with responding elements at ends of longitudinal girders of each section of the base. The mentioned rigid coupling elements are bolted to each section of the base by the bolts 32.

Figure 8:
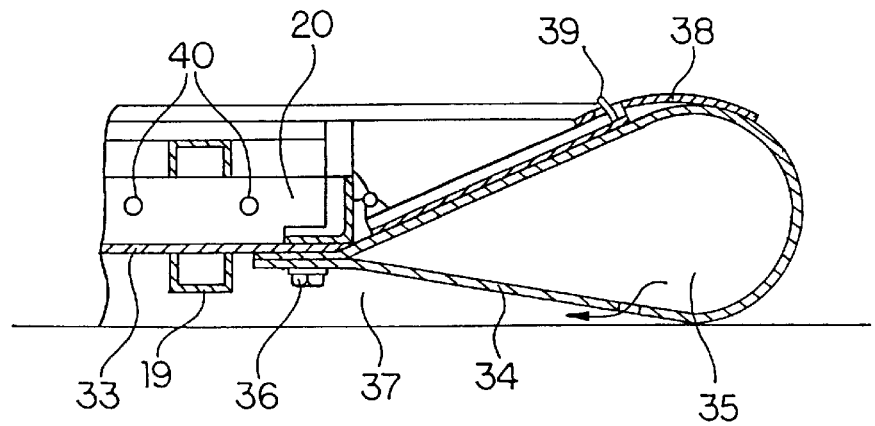
FIG. 8 is a view in cross-section taken on lines A—A of FIG.5 (turned).
Figure 9:
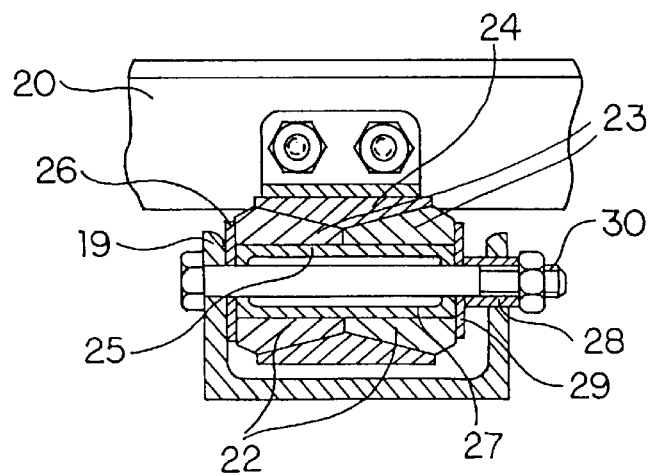
FIG. 9 is a view in cross-section taken on lines B—B of FIG.5.

In order to reduce even more weight and to simplify the apparatus construction the lower surface of main sections is covered by the elastic airtight sheet material 33 (FIGS. 4, 7, and 8) of main sections made, for example, of rubberized cloth. The elastic airtight sheet material 34 covering lower surface of perimeter sections (FIG. 8) is made such that it can form the flexible inflatable skirt chamber 35. The elastic airtight sheet material 33, 34 of main and perimeter sections, being attached by the bolts 36 along outer perimeter of the base in an airtight fashion, forms the inner cavity 37 of an air cushion chamber (FIGS. 4, 8). Such a construction provides a solution to the problem of sealing simultaneously all the lines of folding available in such a structure.

To ensure a possibility of successive fold-up of perimeter sections and of the flexible inflatable skirt into a compact container and to fix the skirt in operational position they (the perimeter sections and the skirt) are fitted with the fastening elements 38 (FIG. 8) made, for example, as straps secured to a receiver and engaged by their holes with the hooks 39 on perimeter sections. With the purpose of securing a vehicle and propulsor-blower installations to an unfolded base the transverse girders 20 of main sections of the base are provided with the fastening elements 40 made as through holes (FIG. 8).

Use of the apparatus is described below.

Figure 10:
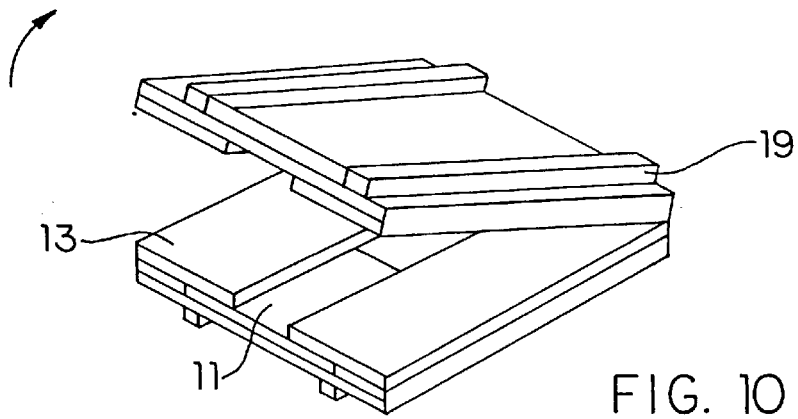
FIG. 10 is a perspective view showing the apparatus at initial stage of unfolding (without skirt).
Figure 11:
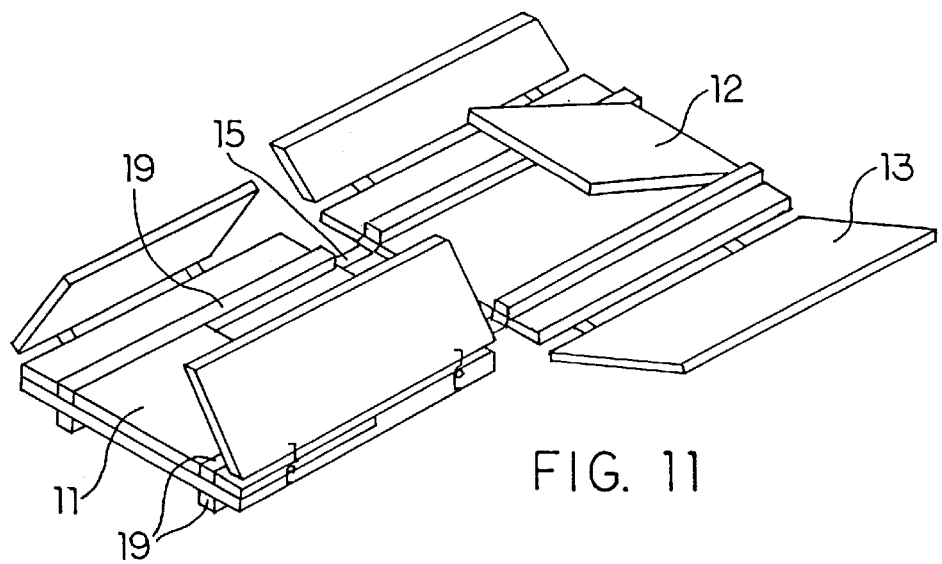
FIG. 11 is a perspective view showing the apparatus with perimeter sections beginning to open up (without skirt).
Figure 12:
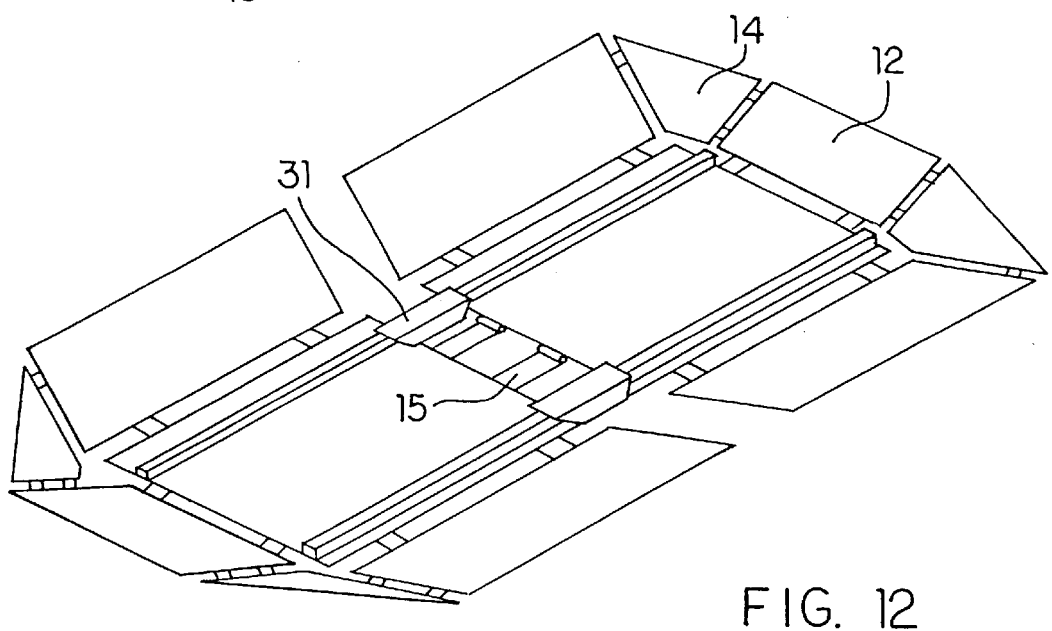
FIG. 12 is a perspective view of the apparatus when unfolded (without skirt).

To transform the apparatus forming a container into an air cushion support it is first unfolded to form a platform (FIGS. 10, 11, 12). The sections 10,11,12,13,14 are unfolded around their hinge joints into operational position. The rigid coupling elements 31 are mounted on the longitudinal girders 19 of the main sections 10 of the base 4 (FIGS. 4, 5, 6) fixing the base in unfolded position and preventing it from spontaneous fold-up. After that, drives of propulsion and blowing means (not shown) and the propulsion and blowing means 6 themselves are installed using the fastening elements 40. The drives are coupled to the propulsion and blowing means by the kinematic coupling 9. Next, the steering gear 7 is mounted and the flexible inflatable skirt 5 is attached to perimeter sections by means of the fastening elements 38,39. The sections are fixed in operational position (FIGS. 14, 15).

When the container is used as a trailer, being put on its own wheels 2 and hauled by a vehicle, it is necessary prior to performing the abovementioned procedures to dismount its coupler and wheels. The procedures for transforming the container into an air cushion support for the vehicle 3 will be here the same till the moment of installing the kinematic coupling 9. In this case the vehicle is driven onto the unfolded base over the rear section 12 which, after that, is closed and connected to perimeter sections. The vehicle is secured to the base 4 by means of the disengagable brackets 8 and the vehicle driving gear is coupled through the kinematic coupling 9 to the propulsion and blowing means 6. The steering gear 7 is now mounted as well as means for coupling it to the vehicle.

When the vehicle drive is placed in gear, vanes of the propulsion and blowing means start rotating and the assembled structure rises on a cushion of air. When power vanes are transferred from zero mode to operational mode the air cushion support translates on a cushion of air.

To convert the air cushion support back into a compact container or a trailer the reverse sequence is used.

The apparatus when converted into an air cushion support can be used to move across water or rough terrains being at the same time a more ecologically clean, if compared to others, transportation means which does no harm to ground surface or vegetation.

Having thus described my invention, what I claim as novel and desire to secure by Letters Patent of the United States is:

1. An apparatus convertible between an air cushion configuration for transporting a vehicle and a compact container configuration for towing by the vehicle, said apparatus comprising:

detachable trailer wheels for hauling in said compact container configuration;

a plurality of latticed sections foldable between a folded position forming a body in said compact container configuration and an unfolded position forming a base in said air cushion configuration, said plurality of latticed sections having at least two main sections and a plurality of perimeter sections;

a plurality of hinge joints interconnecting adjacent ones of said main and perimeter sections;

each of said main and perimeter sections having a planar surface whereby the main sections and the perimeter sections can be folded about respective hinge joints with the planar surface of each perimeter section lying flat against a respective planar surface of said main section in said compact container configuration;

each of said main sections having a plurality of transverse girders and at least two longitudinal girders, said transverse and longitudinal girders interconnected by resilient coupling elements, said resilient coupling elements permitting limited displacements of said girders relative to one another for conforming to a variety of terrain contours in said unfolded position;

a flexible inflatable skirt;

propulsion and blowing means including a blower for creating a cushion of air and an airscrew for providing controllable thrust, said propulsion and blowing means being detachably mounted to the base in said air cushion configuration;

a steering gear for directional control of said apparatus being detachably mounted to the base in said air cushion configuration; and attachment means for securing said vehicle to said base in said air cushion configuration.

2. An apparatus as claimed in claim 1, wherein each of said resilient coupling elements comprises at least two coaxial bushings and each of the longitudinal and transverse girders is provided with a fastening element, each of said bushings having either (a) an outer surface that interacts with a fastening element of one of the longitudinal girders and an inner surface that interacts with a fastening element of one of the transverse girders or (b) an outer surface that interacts with a fastening element of one of the transverse girders and an inner surface that interacts with a fastening element of one of the longitudinal girders.

3. An apparatus as claimed in claim 2, wherein each of said coaxially mounted bushings is made of vulcanized rubber or plastic.

4. An apparatus as claimed in claim 1, wherein said hinge joints are double-pin hinge joints.

5. An apparatus as claimed in claim 1, further comprising rigid coupling means for fixing each of said main sections in said unfolded position.

6. An apparatus as claimed in claim 5, wherein said rigid coupling means comprises at least two rigid coupling elements that are detachably mountable on each of said at least two main sections.

7. An apparatus as claimed in claim 6, wherein said at least two rigid coupling elements and said at least two longitudinal girders comprise means for fixing respective ones of the rigid coupling elements to respective ones of the at least two longitudinal girders.

8. An apparatus as claimed in claim 1, wherein a lower surface of at least one of the at least two main sections is covered by a first elastic airtight sheet, and a lower surface of at least one of the perimeter sections is covered by a second elastic airtight sheet, said first and second elastic sheets having respective ends that overlap.

9. An apparatus as claimed in claim 8, wherein said flexible inflatable skirt comprises said first and second elastic sheets, said flexible inflatable skirt defining a chamber.

10. An apparatus as claimed in claim 1, wherein the flexible inflatable skirt comprises elastic airtight sheet material which is attached in an air tight relationship along an outer perimeter of a lower surface of said base so as to form an inner cavity of an air cushion chamber.

11. An apparatus as claimed in claim 1, wherein said perimeter sections and said flexible inflatable skirt comprise detachable fastening element means for connecting said perimeter sections to said flexible inflatable skirt with the plurality of latticed sections in said unfolded position and for disconnecting said perimeter sections from said flexible inflatable skirt with the plurality of latticed sections in said folded position.

12. An apparatus as claimed in claim 1, further comprising disengageable coupling means for disengageably coupling a running gear of the vehicle to said base such that a suspension of the vehicle can damp vibrations when the apparatus is in the air cushion configuration and is transporting the vehicle.

13. An apparatus as claimed in claim 12, further comprising coupling element means to permit rearrangement of said longitudinal and transverse girders to match dimensions of the vehicle.

14. An apparatus as claimed in claim 1, further comprising means for coupling said blower and said airscrew to a drive unit of the vehicle so as to permit independent operation of said blower and said airscrew.

15. An apparatus as claimed in claim 1, further comprising a mating coupler so that the vehicle can haul said apparatus as a trailer with the apparatus in the compact container configuration.

16. An apparatus as claimed in claim 9, wherein said flexible inflatable skirt comprises elastic airtight sheet material which is attached in an airtight relationship along an outer perimeter of a lower surface of said base so as to form an inner cavity of an air cushion chamber, said elastic airtight sheet material comprising said first and second elastic sheets.

\* \* \* \* \*